Feb. 10, 1959  A. I. BRATTON  2,873,071
ROOM AIR HEATER AND PURIFIER
Filed Sept. 15, 1954  2 Sheets-Sheet 1

*INVENTOR.*
ALFRED I. BRATTON
BY
*William M. Goes*
ATTORNEY

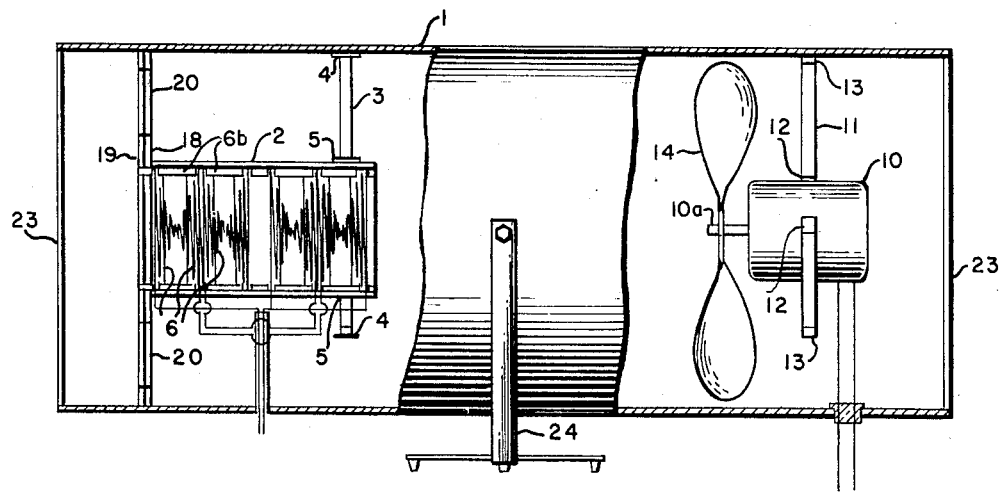
FIG. 2.
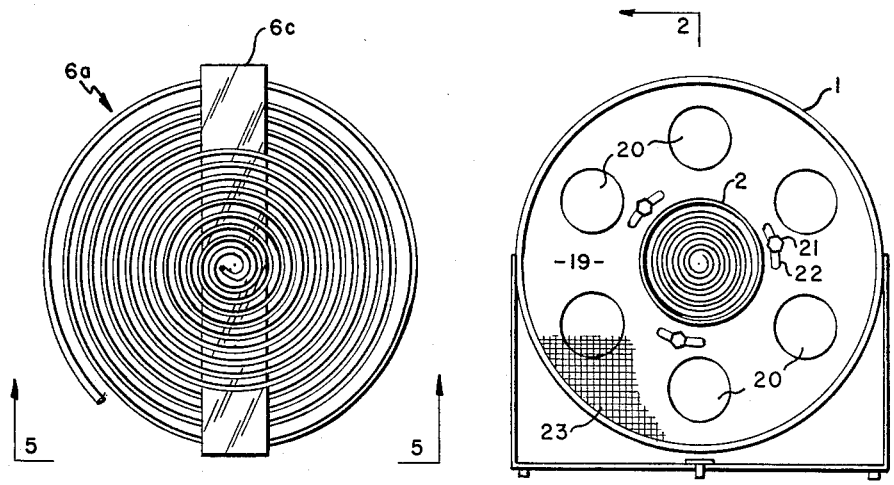
FIG. 4.
FIG. 3.
FIG. 5.
*INVENTOR.*
ALFRED I. BRATTON
BY
ATTORNEY United States Patent Office 2,873,071
Patented Feb. 10, 1959

2,873,071

ROOM AIR HEATER AND PURIFIER

Alfred I. Bratton, Broomall, Pa., assignor to Oxy-Catalyst, Inc., a corporation of Pennsylvania Application September 15, 1954, Serial No. 456,254

8 Claims. (Cl. 237—2)

This invention relates to a method and apparatus for purifying and heating the air within a confined space such as a room within a building.

It is the object of the present invention to provide a combination air heater and purifier operating on a catalytic principle for simultaneously purifying and heating the air within a confined space such as a room.

It is the more specific object of the invention to provide a relatively inexpensive and compact apparatus for simultaneously heating and purifying the air within a room or other confined space using electrical power, such apparatus being of substantially the same size and cost as conventional small room space heaters.

Other objects of the invention will appear from the description and annexed drawings.

Many of the contaminants commonly found in room atmospheres can be eliminated by catalytic oxidation methods. Contaminants such as, for example, carbon monoxide, methane, smoke, hydrogen, hydrocarbons, odor creating substances such as volatile organic esters, and in general any oxidizable contaminents can be eliminated by flowing the contaminated air across an oxidation catalyst to catalytically oxidize these impurities and produce relatively innocuous products of combustion which are not objectionable as are the contaminants in their unoxidized form.

It has been found that with practical, presently available catalysts, these contaminants can be oxidized only at relatively elevated temperatures, in the neighborhood of 350° F. to 500° F. or higher. These elevated temperatures can be attained by heating the contaminated air prior to catalytic treatment or by heating the catalyst or by a combination of these methods. Regardless of the manner in which the temperature required for the reaction is attained, the stream of purified air will leave the catalyst at a temperature of at least 350° F. and possibly higher.

This necessarily high exit temperature of the purified air from the catalyst necessitates a relatively low circulation rate of the room air over the catalyst when such a catalytic purifier is incorporated into a room space heater. The reason for this low circulation rate of air over the catalyst is, of course, to avoid delivering excessively large quantities of heat into the room such as would raise the ambient temperature to unduly high levels. By way of example, if the amount of heat delivered to an average size room is limited to about 5,800 B. t. u./hr. in order to avoid raising the temperature of the room to a level above that of physical comfort and if the purified air leaves the catalyst at 500° F. then the flow of air from the catalyst or the circulation of the room air through the catalyst must be limited to about 12.5 s. c. f. m. (standard cubic feet per minute).

In space heating operations of the general type under consideration, delivery into the room of such a high temperature stream (500° F.) at such a low rate of flow (12.5 s. c. f. m.) would be completely impractical. First of all, a stream of air at such an elevated temperature would create a serious fire hazard and cause serious burns to anyone in its vicinity. Secondly, at such relatively low flow rates, distribution of the heat throughout the room would not take place properly; at such rates, the flow into and out of the heater-purifier would be such that the air within a relatively localized zone in the vicinity of the apparatus would be continually recirculated, heat reaching the other portions of the room only by chance convection currents. Under such circumstances both the heating and purification effect would be exceedingly non-uniform.

In accordance with the invention, these difficulties are eliminated, and a practical combination room heater and purifier is provided, by withdrawing a stream of air from the room into the heater-purifier device at a rate sufficiently high to induce the circulation necessary to distribute the heated air relatively uniformly through the space it is desired to heat, dividing this stream of air into two portions within the device, treating a minor portion of the stream by flowing it over an oxidation catalyst, by-passing the major portion of the circulating stream so as to avoid the catalyst, and recombining and mixing the two streams before delivery into the room. In this manner, the necessary circulation for both uniform heating and purification of the room air is provided, while at the same time the stream of heated air, a part of which has been catalytically purified, is delivered into the room at a temperature within the range of physical comfort for space heating air. The optimum ratio of the stream which is catalytically treated to that which by-passes the catalyst within the heater-purifier device varies somewhat depending upon the operating temperature of the catalyst and other considerations as will appear more in detail hereafter, but should always be such that the desired rate of circulation is attained and such that the combined stream delivered to the room is at a comfortable temperature for space heating, of the order of, for example, 120° F. to 150° F. and preferably in the range of about 120° F. to 130° F.

For a better understanding of the invention reference is now made to the annexed drawings in which:

Fig. 2 is a sectional view taken along the line 2—2 of Fig. 3.

Fig. 3 is an end view taken in the direction of the arrows 3—3 of Fig. 1.

Fig. 4 is a plan view of a coil of a type usable with the present invention.

Fig. 5 is a view taken in the direction of the arrows 5—5 of Fig. 4.

Figure 1:
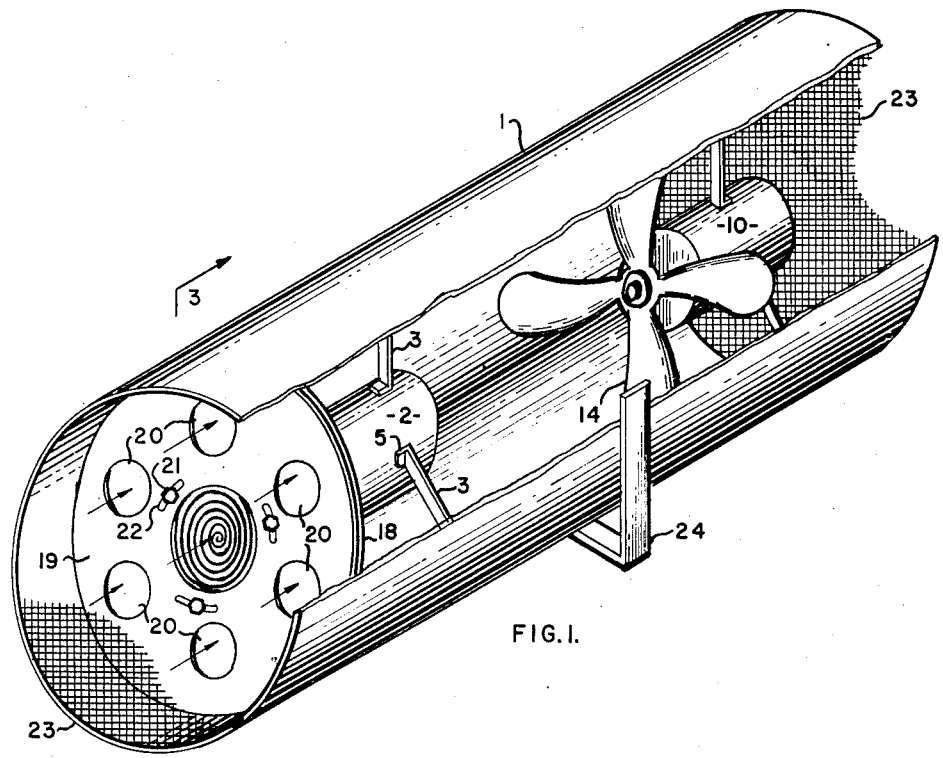
Fig. 1 is a perspective view, with parts broken away, of a combination room air heater and purifier constructed in accordance with the principles of the invention.

The embodiment of the invention shown in the drawings and described in detail hereinbelow is particularly intended as a relatively low heating capacity unit for use in heating small rooms or as a means of supplementing a central heating system for larger rooms. It is understood, however, that the principles of the invention are generally applicable to larger units capable of supplying all of the heat required to heat a relatively large room or to heat an entire building.

Figs. 1-3 show a preferred embodiment of an apparatus capable of purifying and heating air in accordance with the principles of the present invention. This apparatus consists of a generally elongated conduit 1 of sheet metal or similar material within which is concentrically mounted a second conduit 2 by means of braces 3. These braces are provided with flanges 4, 5 on each end thereof which are secured as by welding to the interior surface of conduit 1 and to the exterior surface of conduit 2. As shown in Figs. 1 and 3, conduit 2 is considerably smaller than conduit 1 and is mounted adjacent one end of conduit 1.

A plurality of conical-shaped catalytic coils 6 are mounted within conduit 2. Each of these coils comprises two conical half coils 6a (Figs. 4 and 5) which are joined at their meeting apices. Coils 6 are preferably wound from a suitable resistance wire and subsequently coated with an oxidizing catalyst in a manner described below. Coils 6 are mounted within conduit 2 by means of suitable ceramic sleeves 6 b. As clearly shown in the drawings the largest convolutions of each coil are contained between the adjacent edges of the sleeves 6b which fit within conduit 2. A strip of mica 6c or similar dielectric material is provided for the purpose of supporting the coils and maintaining them properly centered. This mica strip extends through between two of the intermediate convolutions and abuts the ceramic sleeves 6b.

Figure 6:
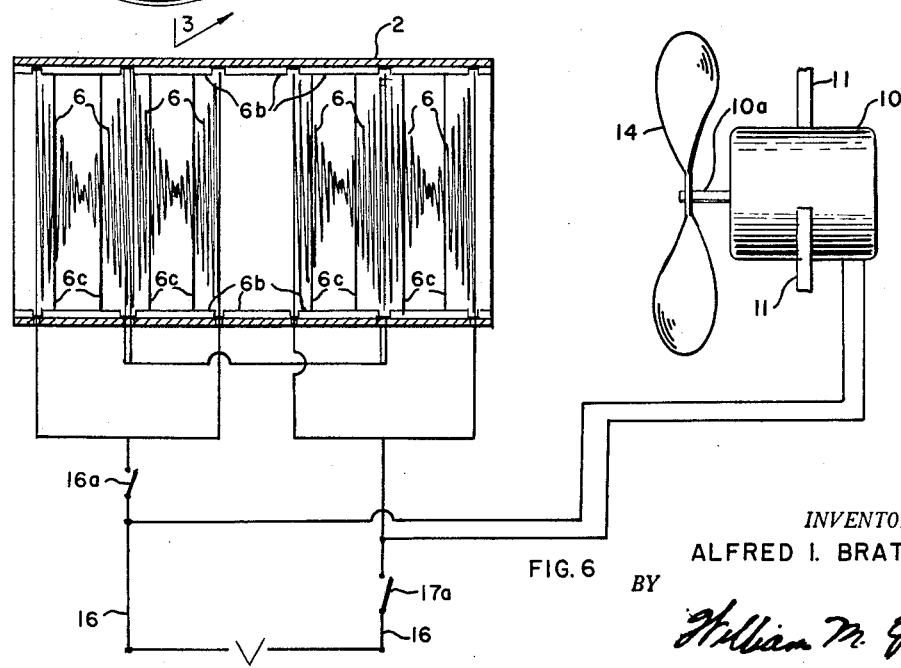
Fig. 6 is a semi-diagrammatic view of the fan and catalytic coils which form part of the invention showing the manner in which these parts are electrically connected.

An electric motor 10 is mounted within conduit 1 adjacent the right hand end (as viewed in Fig. 2) by means of braces 11 having flanges 12, 13 on each end thereof. A fan 14 is mounted on the shaft 10a of motor 10 which drives the fan in a direction to draw air through conduit 1 as indicated by the arrows. As shown in Fig. 6, the coils 6 and motor 10 are connected in parallel across a power source V. Switches 16a and 17a provided on the leads 16, 17 from power source V permit power to be supplied to either the motor alone (by opening switch 16a and closing switch 17a) or to both the motor and the coils 6 (by closing both switches 16a, 17a). As will be explained below, this arrangement permits both use of the fan alone, as an air circulating means, and use of the fan and coils simultaneously, as an air circulating, heating and purifying means. The four coils 6 are electrically connected across voltage source V with two coils in parallel being series connected with two coils in parallel.

An adjustable shutter is provided within conduit 1 and in surrounding relationship to conduit 2 for the purpose of regulating the proportionate volumes of air which flow across coils 6 and which by-pass coils 6. This shutter comprises a fixed member 18 and a movable member 19. These two members, which are similar in structure, are each provided with a plurality of apertures 20 and are joined together by means of a pin-slot connection 21, 22. Fixed member 18 is rigidly secured as by welding along its edges to the interior surface of conduit 1 and to the exterior surface of conduit 2. The effective area of the apertures 20 in the members 18, 19 is, of course, varied by rotating member 19 relative to its fixed counterpart 18. In this manner the proportionate volumes of air which flow across coils 6 and which by-pass coils 6 (by flowing through apertures 20) can readily be varied.

As shown in Figs. 1 and 2, each of the open ends of conduit 1 is covered by a guard 23 of screening or the like for the purpose of obviating manual contact with the blades of fan 14 or the coils 6. A stand 24 is provided for the purpose of locating the device at the desired location within a room.

In the operation of the device fan 14 draws a continuous stream of air into the left hand end of conduit 1, as viewed in Fig. 2. This air stream divides into two portions one of which flows through conduit 2 and across coils 6 while the second portion flows through apertures 20 and by-passes coils 6. The coils are, of course, maintained at an elevated temperature by the passage of an electric current therethrough, at which the catalytic coating on the coils is operative to oxidize the impurities in the portion of the air stream which flows across the coils. This portion of the air stream is heated to a relatively high temperature, at least 350° F. to 500° F., as a result of its contacting the coils and to a lesser extent as a result of the oxidation of the impurities therein. The two portions of the air stream are then reunited at a point downstream from the coils and intermixed by the fan 14. The intermixing of these two portions yields a resultant stream of heated purified air at a temperature considerably less than the portion which flows over the coils 6. Depending upon the setting of shutter 19, the temperature of this resultant stream will be between about 120° F. and 150° F. This resultant stream flows out of the right hand end of conduit 1 (as viewed in Fig. 2) and into the room in which the device is being operated.

In the embodiment of the invention of Figs. 1–3, fan 14 is located downstream rather than upstream from coils 6 and is mounted a substantial distance from the coils. With this arrangement the two portions of the air stream, one of which flows across the coils and the other of which by-passes the coils, are thoroughly intermixed during their passage through the conduit and by the action of the fan which is advantageous in that the resulting stream will thereby leave at a uniform temperature. If desired, however, the fan may be mounted upstream from the coils 6, in this case it being desirable to provide suitable baffles within conduit 1 downstream from the coils. Such baffles should be arranged to effect the admixture of the heated purified air and the unheated air and thereby assure a uniform temperature of the air leaving the device. It should also be noted that in this latter arrangement where the fan is mounted upstream from the coils 6, it will not be exposed to the stream of heated air.

Where the device is to be operated from a conventional 110 volt source of power and limited to a current of about 15 amperes (as with most domestic appliances) the fan by way of example may be of sufficient capacity to draw about 13 s. c. f. m. (standard cubic feet of air per minute) across the coils and about 60 s. c. f. m. through the openings 20. With a fan of this capacity, the rate of recirculation of air will be 73 s. c. f. m. which, in the case of a room of ordinary size, will be sufficient to effect uniform distribution of the heated and purified air. As noted above, the air circulation within the room must be sufficiently high to avoid the development of a localized hot spot of continuously recirculating air in the immediate vicinity of the device. Also where the power supply is limited to a conventional 110 volt source it has been found that the conduit 1 may conveniently have a diameter of about 8 inches and the conduit 2 a diameter of about 3 inches. With these approximate dimensions the air flowing across coils 6 will be substantially completely purified and the stream of air which flows through openings 20 and by-passes conduit 2 will be sufficient to yield an exit air temperature in the range of about 120° F. to 150° F. Under these conditions of operation, the ratio of the rate of air flow through the openings 20 to the rate of air flow across the coils 6 will be about 4.6 to 1. It should be mentioned, however, that this ratio might be as low as 2.5 to 1 under some circumstances as, for example, where the ambient temperature is exceptionally low. This ratio can be changed to produce the desired exit temperature by merely rotating member 19 relative to member 18 to vary the effective area of the openings 20. It is realized, of course, that the foregoing dimensions and conditions of operation are intended merely as non-limiting examples. Obviously, if a 220 volt source of power is available or if an air temperature (of the heated purified air) of over 150° M. is permissible larger coils would be provided than those of the described embodiment.

As previously noted, the required temperature for catalytic air purification can be attained by heating the contaminated air prior to purification or by heating the catalyst or by a combination of these methods. In the embodiment of the invention shown and described above, each of the four catalytic coils is heated to the same extent by the power source V. It should be mentioned that satisfactory results have also been obtained by heating the first coil encountered by the air stream to a relatively high temperature while the remaining coils are maintained at a somewhat lower temperature. With this arrangement the first coil functions primarily as an air heating coil so that the air is heated prior to catalytic purification.

The present invention is applicable to any operative catalyst and it is not intended that the invention should be limited to a particular catalyst or to a catalyst in a particular form such as the disclosed coils. It has been found, however, that satisfactory results can be obtained with coils of the type shown wound from 80 Ni 20 Cr wire of 0.040" diameter, and coated with a catalytic form of an inorganic oxide or mixture of such oxides, which coating is subsequently impregnated with a suitable metal catalyst such as platinum. The oxide coating can be produced by dipping the coil in a slurry containing the oxide or mixture of oxides and aluminum nitrate and subsequently heating the coil to about 1000° F. This operation will produce a coating having a thickness of about 0.0001" to 0.0005" which is firmly adherent and quite hard. Coatings thicker than 0.0005" can be produced by repeating the dipping and drying operation outlined above. Preferably the thickness of the coating should be in the range of about 0.0003" to 0.0015" for best results. The coated coil is then dipped in a solution of chloroplatinic acid ($H_2PtCl_6 \cdot 6H_2O$) containing about 1% platinum by weight and again heated to about 1000° F. This second heating step will decompose the chloroplatinic acid and produce a catalytic structure containing about 1% by weight of platinum (based on the weight of the oxide coating).

It has been found that for coated wire catalysts of the type employed in the instant invention highly satisfactory results can be obtained if a slurry containing a mixture of catalytic alumina and catalytic beryllia is used for the coating operations. Such catalysts are fully described in copending application Serial No. 442,258 filed July 9, 1954, now Patent No. 2,731,541 for Catalytic Structure and Apparatus by Eugene J. Houdry and Wilfred M. Adey.

It is contemplated that the invention will be incorporated into conventional auxiliary space heaters and that in performing the usual heating function the invention will of course purify the air within the room in which it is placed. Such purification of the air within a room is, of course, most desirable under circumstances in which an auxiliary room air heater would be used, that is in cold climates, since frequently there is a tendency on the part of the occupants within a room to fail to provide sufficient ventilation and fresh air where the outside ambient temperature is low. Furthermore, the introduction of air from the atmosphere into a room is uneconomic where the outside ambient temperature is low since such air must be heated after admission into the enclosed room. With the present invention, on the other hand, the air is purified of disagreeable or noxious components during the period in which it is heated. The embodiment of the invention shown in Figs. 1–3 can, of course, be used as a fan only in the event that its air heating and purification functions are not required. Obviously, it is only necessary to deactivate the coils 6 while operating the fan 14 to achieve this result. The present invention is not, of course, limited to applications involving inhabited rooms. It is contemplated that the invention will find utility in enclosed spaces having hazardous or disagreeable industrial atmospheres, for example in rooms having apparatus that give off combustible or other oxidizable gases such as hydrogen, or oxidizable vapors such as toluene vapors which may, if not exhausted to the outside, build up to explosive proportions. With the present invention a continuous purification and oxidation process can be carried out to preclude the possibilty of such explosive proportions ever being attained.

As previously noted the principles of the invention are applicable to large heating units adapted to heat an entire room or an entire building. In this connection it should be pointed out that in treating air in accordance with the principles of the invention, the purifying capacity of the system is directly proportional to the amount of heat delivered by the system. Therefore, with a larger heating unit than the one illustrated herein, it would be feasible to purify a larger volume of air per unit time. For example, if the unit were constructed to deliver 15,000 B. t. u./hr. it would be feasible to flow 1940 s. c. f. m. of air across the catalyst. Operation of a heating and purifying system under these conditions would, under many circumstances, remove virtually all of the contaminants in a relatively large room.

While I have disclosed a preferred embodiment of the invention, obvious modifications thereof within the scope of the appended claims will be apparent to those skilled in the art to which it appertains.

I claim:

1. A method for simultaneously heating and purifying air within an enclosed space comprising the steps of withdrawing a stream of air from said space, flowing the major portion of said stream through a first passage, while flowing a minor portion of said stream through a second passage in parallel with said first passage, said major and minor streams being isolated from one another and thereby prevented from mixing while flowing through said passages, passing said minor stream in direct contact with a heated oxidation catalyst disposed in said second passage, heating said minor stream during its flow through said second passage to a temperature of at least 350° F. and catalytically oxidizing the oxidizable impurities in said minor stream at said elevated temperature through contact with said oxidation catalyst, flowing said major stream through said first passage without any substantial heating thereof, mixing said heated and purified minor stream from said second passage with said unheated major portion from said first passage and thereafter discharging the mixed streams at a temperature suitable for space heating air to said enclosed space.

2. A method in accordance with claim 1 in which said minor stream flowing through said second passage is heated to a temperature of at least 500° F.

3. A method in accordance with claim 1 in which the ratio of air flow in said first passage with respect to that in said second passage is maintained at a value of at least 2.5:1.

4. A method in accordance with claim 1 in which the mixed stream made up of said minor heated portion and said major unheated portion is discharged into the space at a temperature of the order of 120° F. to 150° F.

5. A device for simultaneously heating and purifying air comprising a first conduit open at both ends, a fluid impeller mounted in said conduit adjacent one end thereof and adapted to cause the flow of air through said conduit, a second conduit mounted within said first conduit open at both ends and having a shorter length and a substantially smaller cross-sectional area than said first conduit, the axis of said second conduit being substantially parallel with the axis of said first conduit whereby a minor portion of the air flowing through said first conduit flows into an open end of said second conduit and through said second conduit as a separate stream isolated from said major stream which flows past said second conduit, a heated oxidation catalyst mounted in said second conduit and occupying substantially the entire cross-sectional area thereof whereby said separate minor air stream flowing therethrough is heated to an elevated temperature at which catalytic oxidation of impurities therein takes place, the thus heated and purified air from said second conduit being mixed thereafter with substantially unheated air flowing in said first conduit at the discharge end of said second conduit.

6. A device in accordance with claim 5 in which said first conduit is provided with adjustable means for adjustably controlling the amount of air flow in said first conduit.

7. A device for simultaneously heating and purifying air comprising a first conduit open at both ends, a fluid impeller mounted in said conduit adjacent one end thereof and adapted to cause the flow of air through said conduit, a second conduit open at both ends and having a shorter length and a substantially smaller cross-sectional area than said first conduit mounted within said second conduit, said second conduit being mounted within said first conduit in the central portion thereof and substantially coaxial therewith whereby a minor portion of the air flowing through said first conduit flows into an open end of said second conduit and through said second conduit as a separate stream isolated from the major stream which flows around said second conduit, a heated oxidation catalyst mounted in said second conduit and occupying substantially the entire cross-sectional area thereof whereby said separate minor air stream flowing therethrough is heated to an elevated temperature at which catalytic oxidation of impurities therein takes place, said heated oxidation catalyst comprising an electric resistance filament adapted to be energized with an electric current and provided with a coating of oxidation catalyst, the thus heated and purified air from said second conduit being mixed thereafter with substantially unheated air flowing in said first conduit at the discharge end of said second conduit.

8. A device for simultaneously heating and purifying air comprising a first conduit open at both ends, a second conduit open at both ends mounted with said second conduit adjacent one end thereof, a fluid impeller mounted in said first conduit adjacent the other end thereof and having its suction side facing said second conduit, said second conduit having a shorter length and a substantially smaller cross-sectional area than said first conduit and being mounted in said second conduit with its axis substantially parallel to the axis of said first conduit whereby a minor portion of the air drawn into the open end of said first conduit by said impeller flows into an open end of said second conduit and through said second conduit as a separate stream isolated from said major stream which flows past said second conduit, a heated oxidation catalyst mounted in said second conduit and occupying substantially the entire cross-sectional area thereof whereby said separate minor air stream flowing therethrough is heated to an elevated temperature at which catalytic oxidation of impurities therein takes place, the thus heated and purified air from said second conduit being mixed thereafter with substantially unheated air flowing in said first conduit at the discharge end of said second conduit, said impeller being located downstream from the discharge end of said second conduit and occupying substantially the entire cross-sectional area of said first conduit whereby the heated minor stream and the substantially unheated major stream are thoroughly mixed on passing through said impeller before discharge from said first conduit.

References Cited in the file of this patent
UNITED STATES PATENTS

| | | |
|---|---|---|
| 1,705,812 | Fisher | Mar. 19, 1929 |
| 2,177,258 | Jares | Oct. 24, 1939 |
| 2,658,742 | Suter et al. | Nov. 10, 1953 |
| 2,683,796 | Koff | July 13, 1954 |